Feb. 23, 1960  M. B. LELAND  2,926,143
HEAT EXCHANGE SYSTEM
Filed Jan. 18, 1954  2 Sheets-Sheet 1

INVENTOR
Marshall B. Leland
BY
JP Moran
ATTORNEY

United States Patent Office 2,926,143
Patented Feb. 23, 1960

2,926,143

HEAT EXCHANGE SYSTEM

Marshall B. Leland, Canton, Ohio, assignor to The Babcock & Wilcox Company, New York, N.Y., a corporation of New Jersey Application January 18, 1954, Serial No. 404,573

14 Claims. (Cl. 252—417)

The present invention relates to a method of and apparatus for controlling the temperature of a bed of fluidized particle-form material undergoing an exothermal reaction.

In the treatment of hydrocarbon materials under selected temperature and pressure conditions in the presence of a catalyst, the catalyst becomes coated with carbon deposits and looses its catalytic effectiveness. Usually the catalyst is utilized as a moving bed so that the catalyst may be continuously removed from the hydrocarbon reaction zone and delivered to a separate regeneration zone where the carbon deposit may be removed and the catalyst reactivated for reuse in the reaction zone. The catalyst can conveniently be reactivated by contact between the carbon coating and an oxygen containing gas under temperature conditions readily available in the catalyst recycle system. The contact between carbon and oxygen is exothermal, and the temperature of the catalyst regenerating zone will rise. Since catalytic materials can lose their effectiveness when exposed to excessive temperatures many schemes have been proposed, and used, to control and thereby limit the maximum temperatures in the catalyst regenerating zone. One of the arrangements frequently used for controlling the temperature prevailing in a catalyst regenerating zone involves the use of heat absorbing means to remove the excess heat generated during the exothermic reaction. Heat absorption is accomplished by passing a heat absorption medium in controlled amounts through the regenerating zone, with the heated medium removed from the zone and the heat therein converted to useful purposes. Commonly the heat exchange medium consists of water or steam which is passed through heat exchange elements within the regenerating zone in varying rates dependent upon the amount of excess heat present in the regenerating zone. Due to the varying flow of heat absorbing medium to the elements, in accordance with cooling requirements, the elements are subjected to heat shock leading to early failure, expensive repairs and resulting loss of hydrocarbon production.

Controlling the temperature of an exothermic reaction by adsorption of the excess heat in a separate heat absorbing medium is particularly effective in a process utilizing a fluidized bed of particle-form material due to the characteristic temperature uniformity throughout such beds. In such beds, localized over or under heating of the particle-form material is avoided even though the heat removal means may not be uniformly positioned in the fluidized bed.

The problem of heat shock of metallic parts in regenerating kilns can be avoided by my present invention while permitting a wide range in the temperature control of the catalyst being regenerated.

In accordance with the present invention heat exchange elements are submerged in a fluidized bed of particle-form catalyst material undergoing regeneration. The elements are arranged in separate units for parallel flow of a heat absorbing medium through each unit and series flow of the medium through successive units. In controlling the temperature of the fluidized bed, the rate of flow of the heat absorbing medium is controlled, and the medium is cooled in its serial flow from one unit to the next unit. In one preferred form of the invention steam is used as a heat absorption medium, with the steam becoming superheated in passing through a unit of the heat exchange elements. The superheated steam passing from a unit is cooled before being passed serially to the next unit, with a plurality of the successive steps of heating and cooling the steam being utilized. The steam cooling may be performed by direct spray contact between the superheated steam and water, or by surface heat exchange contact between the superheated steam and a separate cooling medium. Heat absorbing media other than steam may also be used.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

Fig. 3 is an enlarged section of an element of the invention taken on the line 3—3 of Fig. 2;

Fig. 4 is an enlarged section taken on the line 4—4 of Fig. 2; and

Fig. 5 is an enlarged section elevation of a portion of the apparatus shown in Fig. 1.

Figure 1:
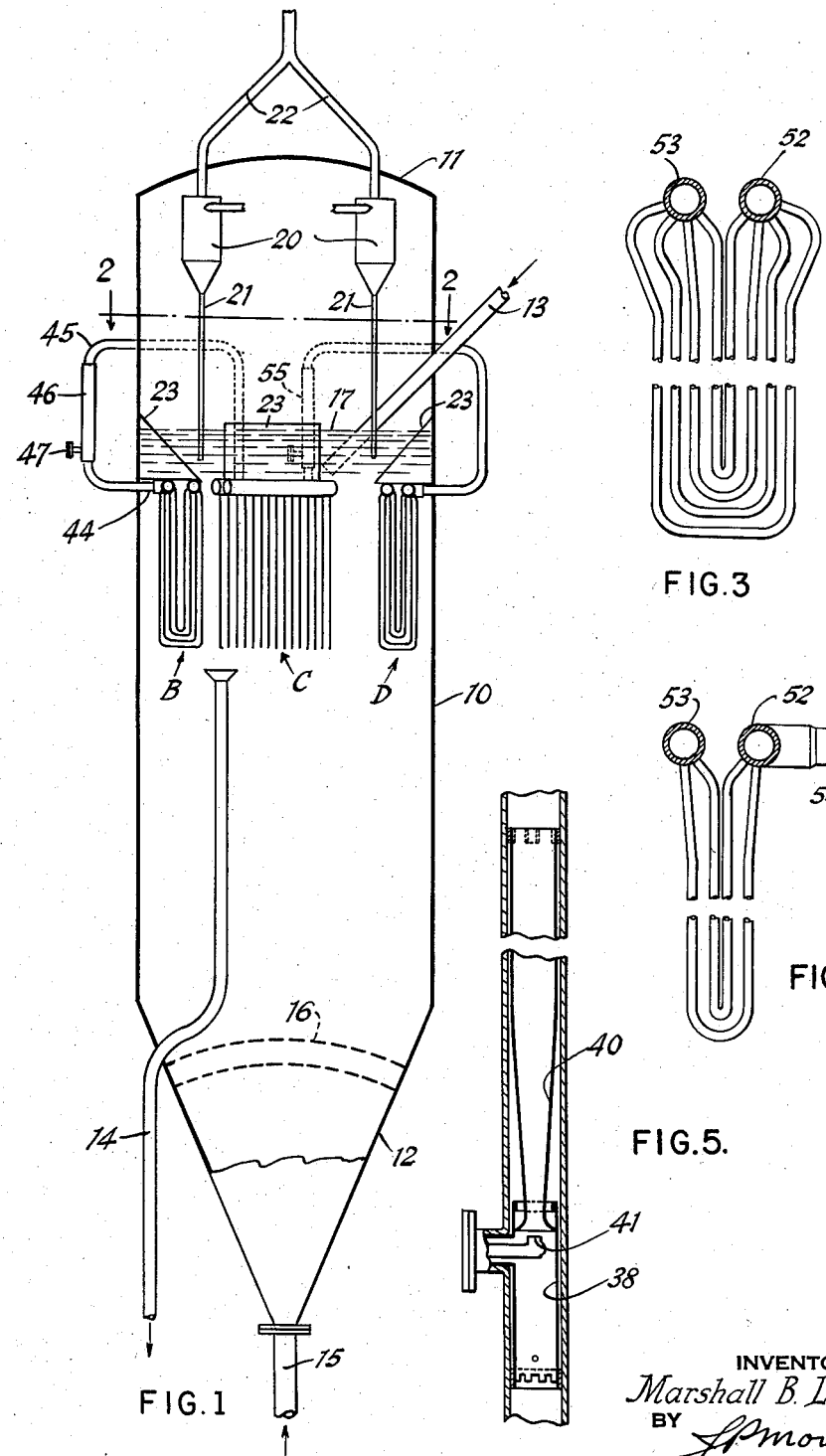
Fig. 1 is an elevation, partially in section, of a catalyst regenerator incorporating the present invention, taken on the line 1—1 of Fig. 2.

The present invention is illustrated in the drawings as associated with apparatus for the regeneration of fluidized catalytic material. In the embodiment shown, steam is utilized as a cooling medium and water is used as the vaporizable cooling medium in the spray attemperation heat exchange apparatus, however, it will be appreciated other forms of attemperation can be used, and heat transfer materials other than steam and water may be utilized, if desired, in the apparatus of the present invention.

As shown in Fig. 1, an upright chamber or vessel 10 of cylindrical horizontal section having a domed top 11 and an inverted frusto-conical bottom 12, is arranged for the regeneration of contaminated catalytic material. A contaminated i.e. carbon coated, catalyst is introduced into the chamber 10 through an inlet duct 13, with the regenerated catalyst discharged through an outlet pipe 14. A fluidizing and regenerating gaseous fluid, such as air or other oxygen containing gas, is introduced into the lower portion of the vessel 10 through a pipe 15 and passes upwardly through a grid 16 to fluidize the particle-form catalyst in the vessel and to burn the carbon with a release of heat.

As indicated in Fig. 1, a more or less distinctive surface 17 of the fluidized bed is maintained in the upper portion of the vessel. Above the surface 17 of the fluidized bed, or as it is sometimes called, above the dense phase surface of the fluidized solid material, one or more cyclonic type separators 20 are installed to separate the entrained catalyst from the gaseous fluid leaving the fluidized bed. The separators have a lower catalytic material discharge spout 21 projecting beneath the surface 17 of the fluidized bed, and an upper gaseous fluid discharge duct 22, which extends through the top 11 of the vessel for discharge to the atmosphere, or when required, through heat recovery apparatus and/or additional dust separating devices prior to atmospheric discharge.

The heat exchange surfaces of the present invention include a plurality of U-shaped tubes or elements connecting inlet and outlet headers, which are submerged in the fluidized bed and are arranged in units with the tubes depending from and supported by the headers which are suspended in known manner by brackets 23 for example, from the wall of the vessel. As shown particularly in Fig. 2, the tubes, with their connected headers, form units of heat exchange elements which are positioned internally of the vessel 10 and adjacent the inner surface of the vessel wall.

Each unit of heat exchange elements receives heat absorbing medium from a point exteriorly of the vessel and discharges the heated medium through a conduit which extends through the wall of the vessel, circumferentially of the exterior side of the vessel and thence through the wall of the vessel to connect with the inlet header of an adjacent unit of heat exchange elements. The heated medium discharged from one unit of heat exchange elements is cooled exteriorly of the vessel by direct contact spray attemperation with a vaporizable liquid medium, and introduced into an adjacent unit of heat exchange surfaces.

Figure 2:
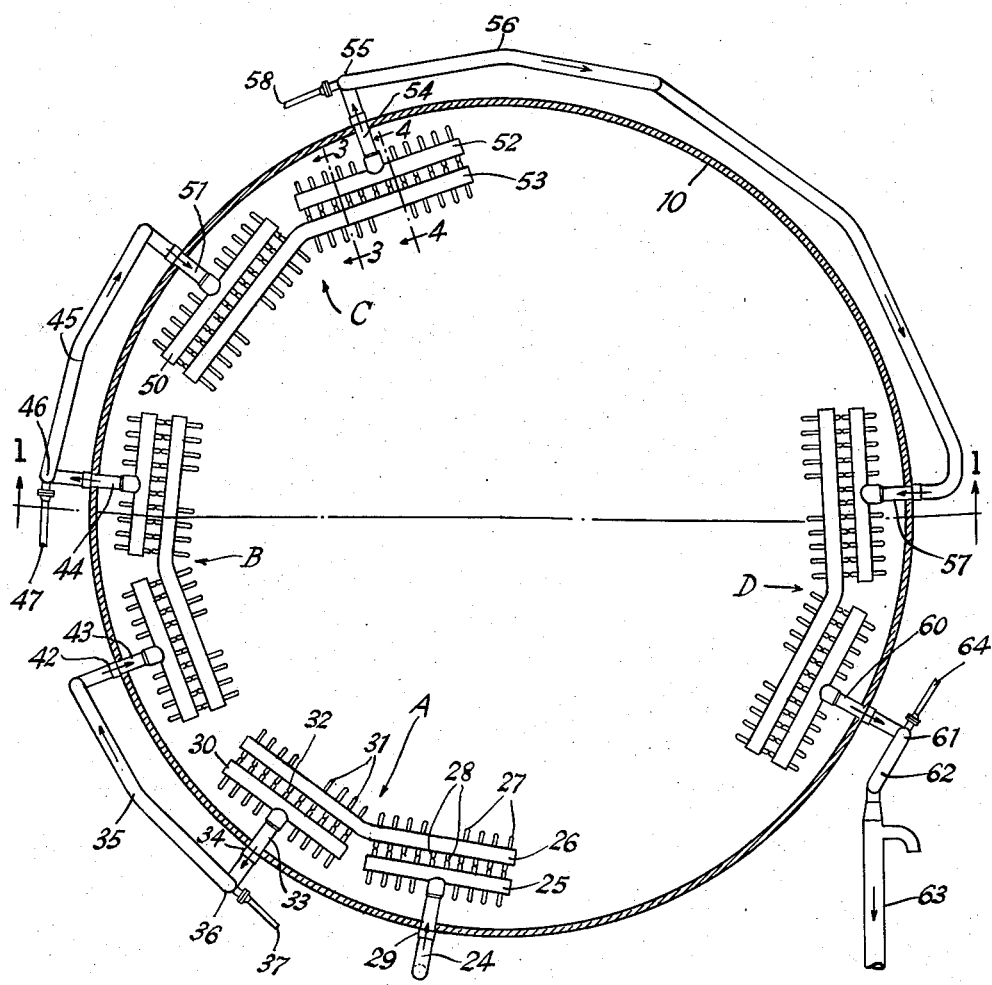
Fig. 2 is an enlarged section view of the apparatus shown in Fig. 1 taken on the line 2—2 of Fig. 1.

In the arrangement shown in Fig. 2, four units A, B, C and D, of the heat exchange surfaces are angularly positioned within the vessel and adjacent the inner wall surface of the vessel 10. Each unit of heat exchange surface includes horizontally disposed headers where the inlet and outlet headers are substantially equally spaced radially of the central axis of the vessel 10, and are disposed substantially at the same elevation in spaced end to end relationship. Each unit is provided with an intermediate header which is positioned at substantially the same elevation as the inlet and outlet headers, and radially spaced inwardly of the vessel wall outlet headers from the inlet and in each unit, U-shaped tubular elements connect the inlet header with an end of the intermediate header for parallel flow of fluid therebetween, while the other end section of the intermediate header is connected with the outlet header by other U-shaped tubular elements.

In the specific embodiment of the invention illustrated in the drawings, the U-shaped tubular elements of the units are arranged in a plurality of rows transverse to the axes of the headers connected thereby. Referring particularly to Fig. 2, an inlet pipe 24 conducts a flow of heat absorbing medium, such as steam, from an external source (not shown) through a thermal sleeve 29 in the wall of the vessel 10 to the inlet header 25 of the unit A. The inlet header 25 is connected to one end section of an intermediate header 26 by U-shaped tubular elements 27 and 28 where the elements 27 are arranged in parallel rows consisting of four elements in each row and the elements 28 are arranged in rows of two elements in each disposed intermediate the length of the header 26. The end section of the intermediate header 26 remote from the elements 27 and 28 is connected with an outlet header 30 by tubular elements 31 and 32 which are arranged in rows similar to the elements 27 and 28.

The heat absorbing medium heated in the unit A is discharged from the header 30 through an outlet pipe 33 which projects a thermal sleeve 34 in through the wall of the vessel 10 and into a pipe system 35 which includes a spray type attemperator 36 and extends to the inlet pipe of the next unit. The attemperator may advantageously be of the type shown in the Fletcher et al. Patent No. 2,550,683 where the spray liquid is delivered to the attemperator 36 in controlled amounts through a pipe 37. When steam is used as a heat absorbing medium and is raised to a superheated temperature by absorbing heat in passing through the unit A, for example, the superheat of the steam delivered to the attemperator is reduced through the evaporation of the water directly sprayed into the steam in its flow through the attemperator.

As disclosed in said patent and shown in Fig. 5, the attemperator consists of a length of pipe provided with a thermal sleeve 38 having a venturi section 40 and orifice means 41 for injecting a spray of cooling medium into the pipe upstream of the venturi throat. In the attemperator described the mixing of the steam and spray water is almost instantaneous, as is the evaporation of the water. By regulating the amount of water delivered to the attemperator the superheat temperature can be controlled to a lower limit substantially equal to the saturation temperature of the steam, if desired.

Leaving the attemperator 36 and the pipe system 35 the steam passes through a pipe and thermal sleeve 42 entering the unit B through an inlet nozzle 43. The arrangement of headers and tubular elements in the unit B is similar to the arrangement described in connection with unit A. The superheated steam leaves the elements of unit B through an outlet pipe 44, and passes to the inlet nozzle of the next unit through a connecting pipe 45 and including an attemperator 46. The attemperator 46 is similar in construction to that of attemperator 36, and is supplied with controlled quantities of attemperating water through a pipe 47.

The cooled steam passing through the pipe 45 is connected with the inlet header 50 of the heat exchange elements of unit C, through a nozzle 51. The inlet and outlet headers, 50 and 52 respectively, as well as the intermediate header 53 of the unit C elements are longer than the corresponding parts of units A and B to accommodate additional rows of the U-shaped tubular elements. An increase in the flow area is avantageous to reduce the pressure drop of the increased steam flow as caused by the use of attemperating water in the attemperators 36 and 46. The superheated steam leaving the header 52 discharges through an outlet pipe 54 into an attemperator 55 in the pipe system 56 connecting the unit C with the inlet nozzle 57 of unit D. The attemperator 55 receives controlled quantities of attemperating water through a pipe 58 so that the temperature of the steam entering the heat exchange elements of unit D can be controlled. The construction and arrangement of the unit D elements is similar to that of unit C, with the steam discharging therefrom through a pipe 60. Each of the inlet and outlet pipes leading to or from the units B, C and D is provided with a thermal sleeve in the wall of the vessel 10.

When steam is used as a heat absorbing medium in the extraction of heat from the fluidized bed in the vessel 10, the superheated steam leaving unit D may be at a higher temperature than desired for subsequent use in a prime mover, for example. It may therefor be advantageous to provide attemperating means in the superheated steam discharge line. For this purpose, an attemperator 61 is installed in the conduit system 62 connected with the outlet pipe 63. The attemperator 61 is similar in construction to the attemperators 36, 46 and 55, and is provided with a spray water inlet pipe 64 for the controlled admission of attemperating water. With such an arrangement the steam used in extracting heat from the fluidized bed in the vessel 10 can be used for useful purposes.

By way of example, and not of limitation, a catalyst regenerator of the type disclosed in Fig. 1 was provided with heat exchange elements having a total surface of approximately 5450 square ft. When supplied with saturated steam at a pressure of 690 p.s.i.a. from an outside source, at an entering steam flow of 280,000 pounds per hour and with the addition of 70,000 pounds of spray water per hour in the attemperators, the apparatus removed 140,000,000 B.t.u. per hour of heat from the catalyst bed in the regenerator. With the U-shape tubular elements having an average length of 22 feet and a 3-inch outside diameter, the total pressure drop through the units A, B, C and D was of the order of 140 p.s.i.

The arrangement of heat absorbing elements with interstage attemperation described is extremely flexible in operation with advantageously close control of fluidized bed temperatures as well as selective control of the steam superheat temperature leaving the unit D. With any specific arrangement and size of heat exchange elements, the total heat absorption from the source of heat can be varied by regulation of the weight of heat absorbing medium in use and by the amount of interstage cooling medium employed. Furthermore, the tubular elements are not subjected to heat shock and resulting short life, since heat absorbing medium flow through the apparatus can be maintained during normal operating conditions of the catalyst regenerator.

While in accordance with the provisions of the statutes I have illustrated and described herein a preferred embodiment of the invention, those skilled in the art will understand that changes may be made in the method of operation and form of the apparatus disclosed without departing from the spirit of the invention covered by my claims, and that certain features of the invention may sometimes be used to advantage without a corresponding use of other features.

What is claimed is:

1. Heat transfer apparatus including a source of heat, a plurality of heat exchange elements the entire surface of each exposed to substantially equal temperatures from said source of heat, means for introducing vaporous heat absorbing medium to said elements, said heat exchange elements being connected for a series flow of said heat absorbing medium therethrough, and means positioned in the heat absorbing medium flow path through said heat exchange elements for modifying the temperature of said vaporous medium.

2. Heat transfer apparatus including a source of heat, a plurality of units of heat exchange elements the entire surface of each exposed to substantially equal temperatures from said source of heat, means for introducing vaporous heat absorbing medium to said elements, said units of heat exchange elements arranged for series flow of said vaporous heat absorbing medium therethrough, and means positioned in the heat absorbing medium flow path through said units of heat exchange elements for mixing a controlled amount of liquid heat absorbing medium with said vaporous medium for cooling the vaporous heat absorbing medium.

3. Heat transfer apparatus including a source of heat, a plurality of groups of heat exchange elements the entire surface of each exposed to substantially equal temperatures from said source of heat, means for introducing vaporized heat exchange medium to one of said groups, said groups of heat exchange elements arranged for parallel flow within each group and for series flow of heat exchange medium between said groups, means positioned in the heat exchange medium flow path through said groups of heat exchange elements for cooling said vaporized medium, and means positioned downstream of said heat exchange elements for cooling the vaporized heat exchange medium flowing from the last of said heat exchange elements.

4. In combination with a vessel confining a bed of fluidized particle-form material undergoing an exothermic reaction, a plurality of heat exchange elements submerged in the bed of said fluidized particle-form material, means for introducing vaporized cooling medium to said elements, pipe means connecting said heat exchange elements for series flow of said cooling medium therethrough, and attemperating means positioned externally of said vessel and in the pipe means connecting said heat exchange elements to lower the superheat of said vaporized cooling medium passed to an adjacent heat exchange element.

5. In combination with a vessel confining a bed of fluidized particle-form material undergoing an exothermic reaction, a plurality of heat exchange elements disposed circumferentially of said vessel and submerged in the bed of said fluidized particle-form material, means for introducing steam into said elements, conduit means disposed in part externally of said vessel connecting said heat exchange elements for series flow of steam therethrough, and water spray steam attemperating means positioned externally of said vessel and in the conduit means connecting said heat exchange elements to lower the superheat temperature of the steam passed to an adjacent heat exchange element.

6. In combination with a closed vessel confining a bed of fluidized particle-form material undergoing an exothermic reaction, a plurality of units of heat exchange elements disposed circumferentially of said closed vessel and submerged in the bed of said fluidized particle-form material, each unit of heat exchange elements including a plurality of depending U-shaped tubes connecting horizontally disposed headers for flow of superheated steam therethrough, conduit means connecting one unit of heat exchange elements with an adjacent unit of elements for flow of steam therethrough, and superheated steam attemperating means positioned externally of said vessel and in each of said conduit means connecting the units of heat exchange elements arranged to spray water into said superheated steam to lower the temperature thereof.

7. In combination with a closed vessel confining a bed of fluidized particle-form material undergoing an exothermic reaction, a plurality of units of heat exchange elements disposed circumferentially of said closed vessel and submerged in the bed of said fluidized particle-form material, each unit of heat exchange elements including horizontally disposed inlet and outlet headers and an intermediate header positioned at substantially the same level and adjacent the vessel wall, a plurality of depending U-shaped tubes connecting said headers for flow of superheated steam therethrough, pipe means connecting the outlet header of one unit of heat exchange elements with the inlet header of an adjacent unit of elements for series flow of superheated steam therethrough, and attemperating means positioned externally of said vessel and in each of said pipe means connecting the units of heat exchange elements for spraying controlled amounts of water into said superheated steam.

8. In combination with a closed vessel confining a bed of fluidized particle-form material undergoing an exothermic reaction, a plurality of units of heat exchange elements disposed circumferentially of said closed vessel and submerged in the bed of said fluidized particle-form material, each unit of heat exchange elements including horizontally disposed inlet and outlet headers substantially equally radially spaced from the inner surface of said vessel, a horizontally disposed intermediate header spaced from said vessel inner surface and said inlet and outlet headers and substantially parallel thereto, a plurality of depending U-shaped tubes connecting said headers for series flow of heat exchange medium from said inlet header to said intermediate header and thence to said outlet header, pipe means connecting the outlet header of one unit of heat exchange elements with the inlet header of an adjacent unit of elements for flow of vaporized heat exchange medium therethrough and attemperating means positioned externally of said vessel and in each of said pipe means connecting the units of heat exchange elements and arranged to spray liquid heat exchange medium into said vaporized medium.

9. A method of regulating the temperature of a fluidized bed of catalyst during the regeneration thereof which comprises cooling said fluidized bed by indirect contact with saturated steam which is superheated thereby, cooling said superheated steam by heat exchange with cooling water, and further cooling the fluidized bed by reheating said stem in surface contact with said bed.

10. A method of limiting the temperature of a fluidized bed of catalyst during the regeneration thereof which comprises cooling said catalyst by indirect heat exchange contact with steam which is superheated thereby, cooling said steam by mixing and vaporizing cooling water therewith, reheating said cooled steam by heat exchange contact with said fluidized bed which is cooled thereby, and regulating the amount of heat withdrawn from said fluidized bed by controlling the quantity of cooling water mixed with and vaporized by said superheated steam.

11. A method of regenerating spent catalyst which comprises the steps of continuously passing said spent catalyst through a regenerating zone, introducing a regenerating gas into said regenerating zone to form a fluidized bed of said catalyst, controlling the temperature of the catalyst bed in said regenerating zone by removing heat from the bed by indirect heat exchange with a vaporized heat transfer medium, cooling the hot heat transfer medium by the vaporization of liquid therein externally of said catalyst bed, and reintroducing said cooled vaporized medium into indirect heat exchange contact with said bed of catalyst material for further removal of heat from said bed.

12. A system for removing heat from a bed of fluidized solids and for providing temperature control by steam superheating which comprises generating saturated steam at elevated pressure, passing saturated steam generated thereby through a tubular coil located in a bed of fluidized solids maintained at high temperature, controlling the temperature of the steam passing through the coil and rate of heat removal from the bed of fluidized solids by injecting a cooling spray into direct contact with the steam at a point intermediate the coil inlet and the coil outlet and discharging superheated steam from the coil outlet.

13. A system for removing heat from a bed of fluidized solids and for providing temperature control by steam superheating which comprises generating saturated steam at elevated pressure, passing saturated steam generated thereby through a tubular coil located in a bed of fluidized solids maintained at high temperature, controlling the temperature of the steam passing through the coil and the rate of heat removal from the bed of fluidized solids by cooling the steam at a point intermediate the coil inlet and the coil outlet, and discharging superheated steam from the coil outlet.

14. Heat transfer apparatus including a source of heat, a plurality of units of heat exchange elements exposed to substantially equal temperatures from said source of heat, each unit of heat exchange elements including a multiplicity of tubes connecting inlet and outlet headers for parallel flow of steam therethrough, means for introducing steam to a first unit of said heat exchange elements, said units of heat exchange elements positioned for series flow of steam therebetween, and a spray attemperator positioned between each of said units of heat exchange elements and out of direct contact with said heat source for mixing water with said steam for temperature regulation thereof.

References Cited in the file of this patent
UNITED STATES PATENTS

| | | |
|---|---|---|
| 2,238,924 | Bennett | Apr. 22, 1941 |
| 2,409,376 | Mekler | Oct. 15, 1946 |
| 2,431,630 | Averson | Nov. 25, 1947 |
| 2,462,861 | Gunness | Mar. 1, 1949 |
| 2,492,948 | Berger | Jan. 3, 1950 |
| 2,513,010 | Deverall | June 27, 1950 |
| 2,571,380 | Penick | Oct. 16, 1951 |
| 2,590,712 | Lacerena | Mar. 25, 1952 |
| 2,635,110 | Watson | Apr. 14, 1953 |
| 2,654,659 | Friedman | Oct. 6, 1953 |
| 2,664,346 | Mahew | Dec. 29, 1953 |
| 2,697,334 | Clarke | Dec. 21, 1954 |
| 2,755,782 | Campbell et al. | July 24, 1956 |